Patented Aug. 10, 1926.

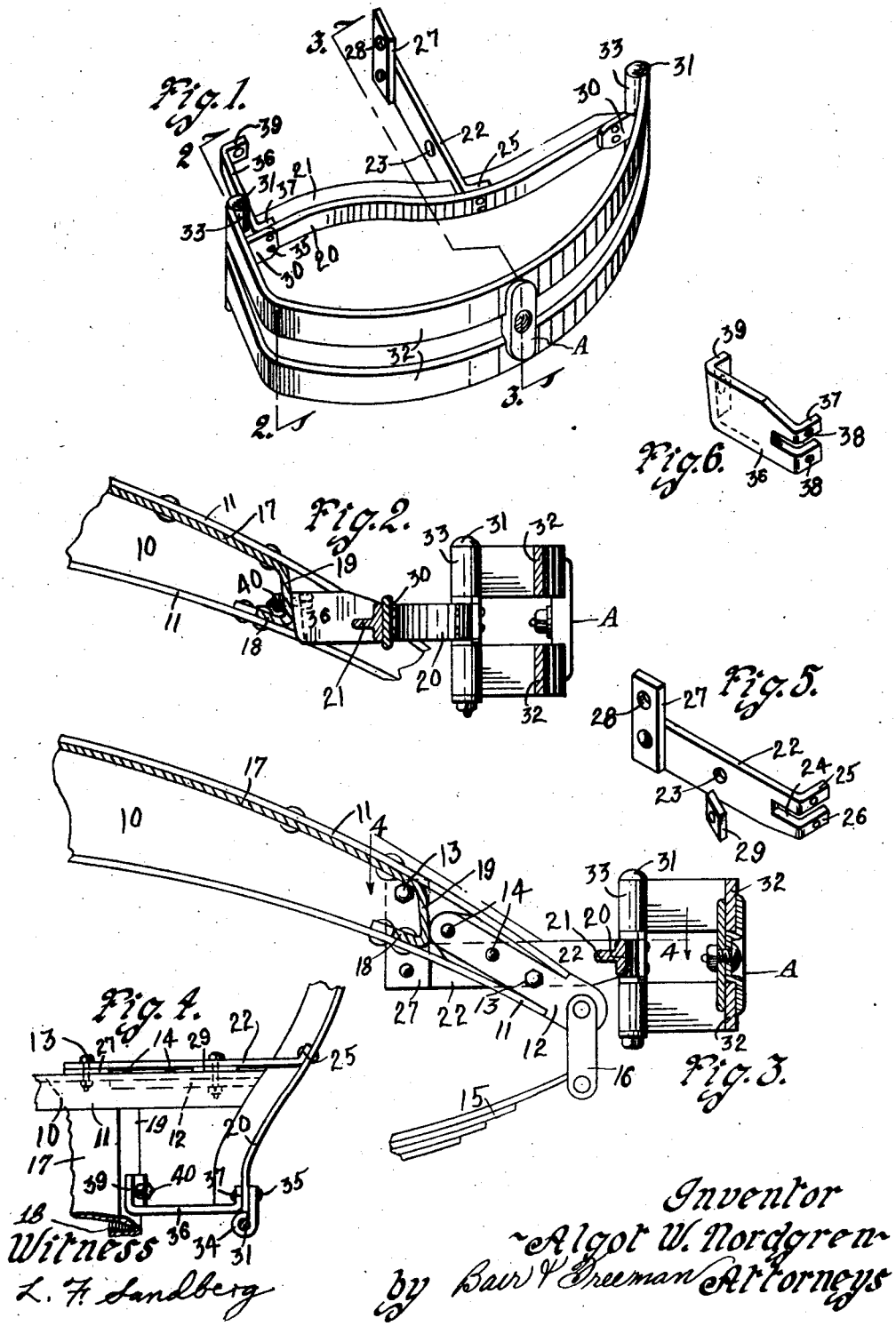

1,595,679

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

FENDER GUARD.

Application filed April 26, 1926. Serial No. 104,637.

The object of my invention is to provide a fender guard adapted for use in protecting the fenders of an automobile, the parts being simple and readily manufactured and capable of being marketed, at a comparatively low cost.

More particularly my invention relates to a fender guard wherein the fenders of an automobile may be protected against damage by collision.

Still a further object is to provide a support for the fender guard adapted to readily associate itself with the standard parts of the automobile frame and body whereby the fender guard may be connected and easily installed in position upon the automobile.

My fender guard illustrated in the accompanying drawings is especially adapted for use in connection with the well known Dodge automobile, although, it may be used upon other types and makes of automobiles.

With these and other objects in view, my invention consists in the construction, arrangement, and combination of the various parts of my fender guard and support, whereby the objects contemplated are attained, as hereinafter more fully set forth pointed out in my claims, and illustrated in the accompanying drawings, in which:

Figure 1, is a perspective view of my improved fender guard and support therefor.

Figure 2, is a sectional view taken on line 2—2 of Figure 1 showing the brace connection between one end of the fender guard and the automobile body.

Figure 3, is a sectional view showing a part of the automobile frame and the support for connecting the fender guard to the automobile frame.

Figure 4, is a sectional view taken on line 4—4 of Figure 3 illustrating the relative position of the supporting element and brace element.

Figure 5, is a perspective view of the supporting element; and

Figure 6, is a perspective view of the brace element.

In the accompanying drawings I have used the reference numeral 10 to indicate generally an automobile frame. The frame 10 is of the usual construction and includes longitudinal arranged members connected to transverse members.

The rear ends of the longitudinal members are inclined downwardly and horn shaped as at 11. The horn shaped ends of the frame 10 are channel shaped in cross section and open inwardly or toward each other and between the upper and lower flanges of the frame 10 is placed a fitting 12 connected to the frame 10 by bolts 13 and rivets 14.

My improved fender guard is supported and connected to the automobile frame 10 by the bolts 13 as will hereinafter be more fully set forth.

The springs 15 of the automobile are connected to the frame 10 through shackles and shackle bolts 16 as clearly shown in Figure 3 of the drawings. Mounted upon the frame and forming a part of the automobile itself is a sheet metal cover 17 having a part resting against the upper flange of each channel shaped horn 11 and another part as at 18 secured to the lower flange of each frame 10.

The main body portion of the sheet metal member 17 and the portion 18 are connected together by a wall 19 as clearly illustrated in Figures 2 and 3 of the drawings. The portion 18 and wall 19 tend to reinforce the sheet metal member 17 and extends from one side of the frame 10 to the opposite side of the frame 10 and it is upon the wall 19 that my fender guard is connected for bracing purposes.

The parts I have just described are of the ordinary automobile construction preferably of the Dodge type and I will now describe in detail my fender guard and its applicability to the parts I have just described.

My improved fender guard includes a T-shaped member 20 bent to form a reverse curve and arranged with the leg 21 thereof in a horizontal plane.

The member 20 is positioned close to the rear lower end of the horn 11 and arranged to project on either side thereof so that a portion of the member 20 projects just rearwardly of the fenders of the automobile.

Connected to the member 10 between its ends is a flat bar support 22 arranged with an opening 23 therein. One end of the support 22 is slotted or bifurcated as at 24 thereby defining two end portions 25 and 26.

The end portions 25 and 26 are bent at right angles to the main body portion of the support 22 and rest against the flanges of the cross bar or member 20 on opposite sides of the leg 21.

The parts 25 and 26 straddle the leg 21. Secured to the free end of the support 22 and extending upwardly therefrom is an extension 27. The extension 27 is riveted or otherwise secured to the support 22.

An opening 28 is formed in the extension 27 and this opening is designed to register and receive the upper or forward bolt 13 while the opening 23 is designed to register with and receive the lower or rear bolt 13.

The support 22 is thus fixed to the horn 11 of the frame 10 by the bolts 13. In order to have the support 22 spaced a uniform distance from the horn 11 due to the additional extension 27, I provide a washer or the like 29 adapted to register with the opening 23 and receive the lower bolt 13.

The washer 29 is the same width as the extension piece 27. The spacing of the support 22 a slight distance from the horn 11 of the frame 10 prevents it from interfering with the heads of the rivets 14.

Fixed to the outer end of the cross bar or member 20 is an eyelet 30 adapted to receive the bolt 31. Bumper elements 32 have their ends formed with eyelets 33. The eyelets 33 upon one end of the bumper elements 32 register with the eyelet 30 and receive the bolt 31 thus connecting one end of the bumper elements 32 to the cross member 20.

An eyelet 34 is fixed to the inner end of the member 20 and a bolt 31 extends through the eyelet 34 and through the eyelets 33 upon the inner ends of the bumper elements 32. The eyelet 34 is formed by curving a flat piece of metal and riveting it to the member 20 by means of the rivets 35.

A brace element 36 is connected to the member 20 at the inner end thereof of the rivets 35. The rivets 35 connect the brace element 36 and the eyelet 34 to the inner end of the member 20.

The brace element 36 is clearly illustrated in Figure 6 of the drawings and includes a pair of spaced fastening flanges 37 which are formed with openings 38 designed to receive the rivets 35.

The fastening flanges 37 straddle the leg 21 of the cross member 20. The free end of the brace 36 is bent at an angle relative to the main body portion to provide a fastening flange 39. The fastening flange 39 rests against the wall 19 of the sheet metal member 17 and is connected thereto by a bolt 40.

The brace element 36 together with the support 22 properly position and carry the entire fender guard upon the automobile body. The support is of simple construction and is readily adapted for use in connection with the downwardly inclined horn 11 of the frame 10 and the bolts 13 which fasten the frame 10 to the fitting 12.

The brace 36 gives rigidity to the entire fender guard. A spacing device A of any suitable kind is positioned between the spaced bumper elements 32 and serves to space the bumpers apart.

It is apparent that the present embodiment of the invention has been disclosed merely by way of example, and that numerous changes in the details of construction and in the combination and arrangement of parts may be resorted to without departing from the spirit or scope of the invention as hereinafter claimed or sacrificing any of its advantages.

I claim as my invention:

1. A fender guard for automobiles including a cross member, bumper elements secured thereto, a support member fixed to said cross member between its ends, an upwardly extending extension on one end of said support member, means for connecting said extension to the automobile and other means for connecting the support member to the automobile and a brace connecting the inner end of said cross member with the automobile.

2. A fender guard for automobiles including a cross member, bumper elements secured thereto, a support member fixed to said cross member between its ends, an upwardly extending extension on one end of said support member, means for connecting said extension to the automobile and other means for connecting the support member to the automobile and a brace connecting said cross member with the automobile at a point spaced from the connection between said support and the automobile.

3. A fender guard for automobiles including a cross member, bumper elements secured thereto, a support member fixed to said cross member, an upwardly extending extension on said support member, means for connecting said extension to the automobile and other means for connecting the support member to the automobile whereby said support member and extension are secured to the automobile at two spaced points and a brace connected to one end of said cross member and extending forwardly toward the automobile and connected thereto at a point spaced from the two points of connection between the automobile and the support member and extension.

4. A fender guard for automobiles including a cross member having pieces fixed to its ends forming eyelets, bumper elements having eyelets thereon adapted to register with the eyelets in said pieces, bolts extending through said eyelets for securing the bumper elements to the cross member, a support member fixed to said cross member between its ends, means for connecting said support at two spaced points to the automobile and a brace fastened to the inner end of said cross member and one of said pieces, said brace extending forwardly toward the automobile and fastened thereto whereby the fender guard is supported and braced relative to the automobile.

5. A fender guard for automobiles including a cross member having pieces fixed to its ends forming eyelets, bumper elements having eyelets thereon adapted to register with the eyelets in said pieces, bolts extending through said eyelets for securing the bumper elements to the cross member, a support member fixed to said cross member between its ends, an upwardly extending extension on said support member, means for connecting said extension to the automobile and other means for connecting the support member to the automobile and a brace fastened to the inner end of said cross member and one of said pieces, said brace extending forwardly toward the automobile and fastened thereto whereby the fender guard is supported and braced relative to the automobile.

6. A fender guard for automobiles including a cross member, bumper elements secured thereto, a support member fixed to said cross member between its ends, a projecting piece connected to said support at one end thereof, said projecting piece having a bolt opening therein and said support having a bolt opening therein, bolts adapted to extend through said openings for connecting said support and projecting piece to an automobile frame and a brace connecting the inner end of said cross member with the automobile at a point spaced from said support and said projection.

Des Moines, Iowa, April 22, 1926.

ALGOT W. NORDGREN.